United States Patent [19]

Fleissner

[11] Patent Number: 4,657,555

[45] Date of Patent: Apr. 14, 1987

[54] PROCESS FOR RENDERING WOOL SLIVER SHRINKPROOF, AND APPARATUS FOR PERFORMING THE PROCESS

[75] Inventor: Gerold Fleissner, Chur, Switzerland

[73] Assignee: Fleissner GmbH & Co., Maschinenfabrik, Fed. Rep. of Germany

[21] Appl. No.: 685,853

[22] Filed: Dec. 24, 1984

[30] Foreign Application Priority Data

Feb. 2, 1984 [DE] Fed. Rep. of Germany ....... 3403593

[51] Int. Cl.$^4$ .............................................. D06M 3/12
[52] U.S. Cl. ...................................... 8/128 R; 8/108.1
[58] Field of Search ............... 8/151, 158, 156, 128 R, 8/108 A

[56] References Cited

U.S. PATENT DOCUMENTS

| | | | |
|---|---|---|---|
| 1,527,369 | 2/1925 | Meyer | 8/158 X |
| 1,737,149 | 11/1929 | Conoe | 8/151 |
| 2,134,160 | 10/1938 | Kornegg | 8/151 X |
| 2,311,507 | 2/1943 | Arthur, Jr. | 8/128 R X |
| 2,466,695 | 4/1949 | Frishman | 8/128 R |
| 2,671,006 | 3/1954 | Malauchlan | 8/128 R |
| 2,923,596 | 2/1960 | Levin | 8/128 R |
| 2,993,747 | 7/1961 | Scott | 8/128 R |
| 3,062,610 | 11/1962 | Russon | 8/128 R |
| 3,178,309 | 4/1965 | Harding | 8/128 R |
| 3,628,909 | 12/1971 | Goldberg | 8/128 X |
| 4,377,388 | 3/1983 | Mains | 8/151 |

FOREIGN PATENT DOCUMENTS 2410152  9/1975  Fed. Rep. of Germany .......... 8/156

Primary Examiner—Harvey C. Hornsby
Assistant Examiner—Frankie L. Stinson
Attorney, Agent, or Firm—Antonelli, Terry & Wands

[57] ABSTRACT

The process for rendering wool sliver shrinkproof involves complete wetting of at least one laterally unguided wool sliver with a chlorinating liquor at ambient temperature wherein the liquor is applied to the sliver with a four- to sevenfold excess. The sliver is conducted immediately thereafter through a guide slot, together with the applied excess quantity of liquid; the complete wetting of the fibers of the sliver with the chlorinating liquor is effected in this guide slot by separating the wool sliver from possible air occlusions. Subsequently thereto, the sliver is accompanied by the liquor through a small-volume guide channel, to be squeezed out following the chlorine treatment. The apparatus has a pair of squeeze rolls, the cylinders of which are arranged to be spaced apart to form a guide slot and are rotatably mounted, these squeeze rolls being associated immediately thereabove with spray means to supply the chlorinating liquor necessary for complete wetting.

6 Claims, 3 Drawing Figures

PROCESS FOR RENDERING WOOL SLIVER SHRINKPROOF, AND APPARATUS FOR PERFORMING THE PROCESS

This invention concerns a process for rendering wool sliver shrinkproof by treating the sliver with an aqueous solution of hypochlorous acid with a pH of 2.0–3.0 and by effecting subsequent squeezing-out, washing, and drying operations; the solution being applied from both sides to the wool sliver by dipping the sliver into a bath of the solution, and an apparatus for performing this process.

Wool shrinks and mats in the untreated condition while being washed in an aqueous liquid. In order to render the wool mat-free, chemical treatments are known wherein the structure of the wool is altered or treatment media are utilized which contain resin; the resin being precipitated on the surface of the wool fiber and enveloping the fiber. Since these methods entail changes in handle and a substantial effect on the physical properties, such as moisture absorption and dyeing characteristic, the Hercosett chlorination process has been developed which has become widely popular in practice. (This process is described in "Textilveredlung" (Textile Finishing) 16 (1981 No. 2: 43–53) In this process, during a pretreatment of the wool in an aqueous chlorine solution, the surface tension of the wool fiber is raised to such an extent and thereafter even a water-soluble resin will form a quite uniform coating on the wool fiber. However, a uniform chlorinating treatment is a prerequisite for obtaining a mat-free characteristic.

In order to ensure uniform chlorination, sieve or suction drum baths are utilized wherein a number of combed slivers; i.e., untwisted strands, or ropes of the wool fibers obtained from a carding or combing machine, rest in uniform, mutually parallel alignment on the sieve drums, which are subjected to a fluid flow from the outside toward the inside. Dilute sulfuric acid and sodium hypochlorite serve as the liquor used for the treatment medium. With a pH of about 1.5–2.0 and a treatment medium temperature of 15°–20° C., the bath then contains essentially free chlorine and hypochlorous acid (HOCl), effecting the desired modification of the wool fiber surface.

Chlorination in sieve drum baths is beset by several drawbacks. Initially, the slivers lying on the sieve drum are compacted by a suction draft effective from the inside, which can be disadvantageous for lightweight wool qualities, and furthermore the containers for the baths corrode due to the aggressive chlorine gas unless the containers (e.g., tanks) are manufactured from expensive materials. There is also the danger in sieve drum baths of contamination by salts, oil, or grease which can negatively affect the uniform chlorinating action. (These problems are disclosed in "Textilveredlung" (Textile Finishing) 16 No. 2: 43–53 (1981)).

Besides sieve drum chlorination, a device has become conventional which is disclosed in DOS No. 2,621,560, and which consists of a U-shaped treatment tank having a height of one meter and employing a guide roller at the bottom. The wool slivers are seized outside of the tank on both sides by two oppositely running conveyor belts and then transported thereby vertically into the bath downwardly to the guide roller at a depth of one meter and then upwardly again. Gaseous chlorine dissolved in water is used as the liquor. Mixing of the gaseous chlorine with water takes place in an injector, during which step hypochlorous acid is formed in accordance with the following reaction.

$$Cl_2 + H_2O \rightarrow HOCl + HCl$$

This liquor, prior to entrance of the slivers into the bath, is sprayed under pressure from both sides onto the wool slivers retained by the conveyor belts. The slivers then are dipped into the liquor wherein the air bubbles occluded among the fibers are to rise and be replaced by the liquor. The bath temperature for this process must range between 8° and 10° C. Thus, the liquor must be cooled. This step is necessary, on the one hand, because otherwise too little chlorine would be dissolved in the water, and, on the other hand, the reaction would take place too quickly at ambient temperature which is allegedly disadvantageous for the uniformity of the chlorinating effect.

More detailed investigations have yielded the result that the uniformity of the chlorination is not dependent on the gradual degasification of the wool slivers in the chlorinating liquor. On the contrary, if gas bubbles pass with the fibers into the depth of the bath and are detached from the fibers at a deeper bath location, the depleted liquor at that site no longer affords chlorination so that spots during the subsequent dyeing step are unavoidable. It has been found that the desired superficial chlorination effect takes place with rapid action and only upon initial contact of the fiber with the hypochlorous acid. Immediately thereafter, the acid has been partially consumed, the liquor is diluted, so that there is, on the one hand, no danger of an excessive attack on the wool by the acid, but, on the other hand, there cannot be any production of a more uniform chlorinating effect, either, with a prolonged contact of the wool fibers with the liquor.

This invention is based on the object of developing a process and an apparatus for conducting the process wherein it is ensured that the attack of the hypochlorous acid takes place immediately at the beginning of contact only on all points on the surface and, at that location, uniformly over the peripheral surface area of each wool fiber.

This object has been attained by bringing that aqueous chlorine solution in contact with the slivers on all sides at an ambient temperature of about 10°–25° C. preferably 15°–25° C., with a multi-fold, such as four- to sevenfold, preferably fivefold, excess of the solution based on the weight of the dry slivers (i.e., the amount of the solution is from 4 to 7 times the amount of the dry slivers on a weight basis), and conducting the slivers immediately thereafter, together with the applied excess quantity of liquid, through a guide slot, thus completely wetting the slivers, and then transporting the slivers continuously to a squeezing-out stage along a small-volume guide channel in synchronism with the supplied chlorine solution.

In the process of the invention, the temperature of the liquor has been set intentionally higher than in the prior art process wherein the liquor temperature is to range between 8° and 10° C. Apart from the fact that constant cooling of the liquor is required for that purpose, thus consuming energy, it is disadvantageous that the initial reaction of the hypochlorous acid with the wool fiber surface takes place in a muted fashion. Although water absorbs more chlorine due to the lower temperature of 8°–10° C., the chlorine also attacks the wool fiber in the slivers more violently over the contact period. The intended attack on the wool fiber does not stop on the surface but rather advances into deeper strata of the fibers. When wetting the fibers with the liquor being at ambient temperature, the reaction takes place more spontaneously, but also essentially merely over the peripheral surface area of the fibers. The inner regions of the fibers are spared. An excess supply of liquor is a prerequisite of uniformity, so that each fiber is surrounded by flowing liquid immediately at the beginning of the treatment. It has been found that a weight ratio of the sliver to the liquid of 1:4 to 1:5, based on the dry weight of the slivers, is the optimum. Although the higher water consumption is disadvantageous, this is compensated for by the fact that the consumption of energy for cooling the liquid is eliminated. The advantage of the large amount of liquor, however, resides in the constant, intensive rinsing of the slivers in the subsequent guide channel where, in this case, any deposits cannot find a settling place; i.e., no deposits are allowed to form. The success of the novel process manifests itself in the improved handle of the treated wool. The wool is bulkier and softer.

The process of this invention has the result that the reaction of the hypochlorous acid with the wool fibers in the slivers is completed after 5-7 seconds; i.e., before the liquor suffers a dilution process. The surface chlorinating effect on the wool fibers is a function of the velocity of the reaction procedure together with the hypochlorous acid concentration. For these reasons, the "high" temperature of the liquor is advantageous as compared with the state of the art. The larger amount of chlorine gas produced at this temperature is not disadvantageous. This gaseous chlorine is heaver than air; it forms a layer above the bath and can be readily exhausted underneath the cover of the otherwise closed apparatus. Another advantage of the process of this invention resides in that, as contrasted with the prior art, the wool slivers have free space around them during wetting with the treatment liquor. The slivers, during wetting with the hypochlorous acid solution, need not be retained laterally directly above the narrowest point of the guide slot, so that satisfactory access of the chlorinating solution to all fibers of the slivers is ensured. The slivers, accompanied by the liquor, are transported uniformly in the guide slot. It is of advantage for a uniform wetting of the wool slivers with the treatment liquor to mix the latter, after chlorination, with a suitable wetting agent. Although this measure, per se, is basically conventional, it is problematic in the present case since, when mixing the water with the gaseous chlorine in the injectors, gas bubbles are formed in the liquor on account of the vacuum; these bubbles lead to frothing when the liquor is mixed with the wetting agent. This foam is, of course, a drawback when wetting the wool slivers with the liquor because no chlorination effect is obtained where a gas bubble is located. In order to avoid this disadvantage, the liquor should first be degasified.

The apparatus for performing the process of this invention consists essentially of a housing enclosed on all sides, with a liquid tank containing the liquor up to a certain level located within the housing. The result to be achieved essentially in this housing resides in a sudden and complete wetting of the incoming wool slivers with the chlorinated solution. This is accomplished by means of a guide slot constituted by a pair of squeeze rolls rotating in a driven fashion, the slivers, conducted directly side-by-side, passing through these rolls together with the previously introduced liquor. The squeeze roll nip is to be dimensioned so that the liquor, supplied in excess, can run without air inclusion continuously with the introduced wool slivers in its entirety through the nip. Under practical conditions, a certain amount of dammed-up liquid will be produced at the pair of rolls above the narrowest gap, but this will, in all probability, not lead to overflowing. The chlorine solution conducted in an excess amount into this squeeze roll nip; i.e., without being directly sprayed onto the slivers, will run, in the quantity in which it is fed, together with the wool slivers completely wetted in the squeeze roll nip, through this nip and will travel through a subsequent guide channel together with the liquor which, at this point, is already depleted in hypochlorous acid.

In order to ensure the desired wetting of all wool fibers of a wool sliver in the squeeze roll gap or even immediately upstream thereof, the wool slivers must not be squeezed in this gap along the lines of a dewatering step; rather, the fibers should be gathered in the squeeze roll slot precisely to such an extent that any air contained therein is squeezed out and replaced by the liquor. Solely here, in this zone, an immediate wetting of the wool fibers by the treatment liquor is a necessity. This is attained if the squeeze roll nip has approximately a width of 5 mm, and if the liquid is fed to the squeeze roll nip with a fivefold excess as compared with the dry wool slivers. These data can vary in dependence on the thickness of the slivers. In this example, the operation is conducted with a weight of a wool sliver of 25 g/m of traveling sliver.

The guide channel following this guide slot can be of any suitable construction. The prerequisite is merely that the wool slivers, in total, are conveyed continuously through this channel so that there is no loss of fibers and any possibly subsequent damming up of slivers. The wool slivers are accompanied by the previously charged chlorinating solution; namely, the velocities of both media should be the same, possibly, the liquid should flow even faster than the conveying speed set for the wool fibers. A certain washing operation takes place within the guide channel, intensified, in particular, by the large amount of available liquor. A row of guide rolls rotating in a driven fashion and arranged sid-by-side has proven itself well as means for transporting the slivers through the guide channel, these rolls being traveled by the wool slivers in a meander-like fashion; the guide channel being provided by a plurality of adjacent chamber containing the rolls and being filled with the treatment liquor. In order to ensure a uniform flow of the introduced liquor through this guide channel, the cross section of the channel should be small. For this reason, displacement members which define the channel are associated at the top and at the bottom with the rolls in the apparatus of this invention, leaving a free gap only where the active transport of the wool fibers is provided, but otherwise terminating in close proximity to the rolls.

An essential requirement for successful wetting of the wool fibers right at the beginning of the wetting process is a feeding of the liquor effecting rapid wetting so that the liquor is free of air and/or bubbles. This applies quite generally, no matter which device effects the wetting action. In order to attain this objective, the liquor is first to be blended with a surfactant. However, in order to be able to conduct this step without froth formation, the chlorine solution, mixed with the chlorine gas and thereby replete with gas bubbles, is to be degasified; this is accomplished by means of an upwardly open standpipe equipped with inlet and drain, the drain being arranged at a spacing below the inlet.

One embodiment of the apparatus of this invention is illustrated in the drawing. Still further details of this invention, which are of significance also in combination with other features, are described in reference thereto.

Figure 1:
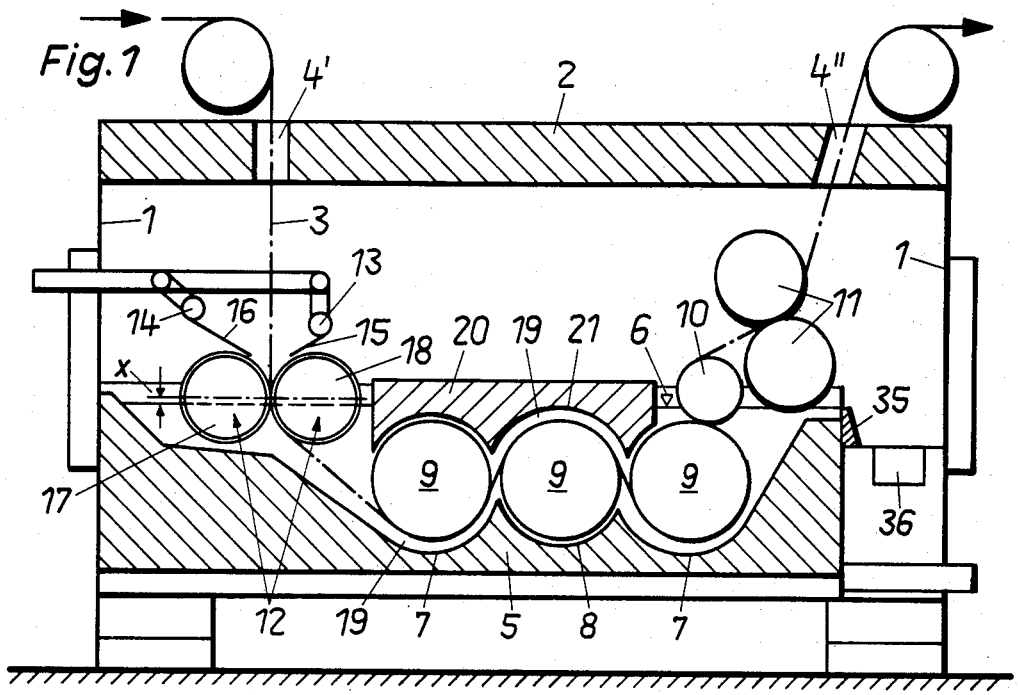
FIG. 1 shows a longitudinal section through a treatment bath provided with a pair of squeeze rolls and guide roll arranged within a guide channel.

The apparatus for rendering wool slivers shrinkproof; i.e., for the complete wetting of a plurality of slivers with a hypochlorous acid, in other words without a subsequent device for resin application, consists of a housing 1, enclosed on all sides, having in the top lid 2, which can be swung open, an inlet slot 4' for the slivers 3 to be introduced and an outlet slot 4" for removal of the chlorinated slivers. The slivers are arranged in close mutual adjacency; i.e., side-by-side, and form a length of fleece, shown in this figure only in a lateral view. A basin 5 made, for example, of a synthetic resin, is arranged on the bottom of housing 1 and is filled with diluted liquor (i.e., liquor which the concentrations of hypochlorous acid are reduced) up to a level 6. Three guide rolls 9 are arranged side-by-side in trough-like recesses 7, 8 of the basin 5 and are driven for the continuous conveyance of the wool slivers 3 through the liquid. Above the third guide roll 9, the slivers 3 are conducted over a contact roller 10 to a pair of squeeze rolls 11 from which the dewatered wool slivers 3 are transported out of housing 1 through the outlet slot 4". The depleted liquor, flows via the overflow 35 into the drain 36.

The essential part of the apparatus for conducting the chlorination is disposed below the inlet slot 4' and comprises a squeeze roll pair 12 located vertically below the inlet slot 4' with the axes of each roll a little higher (1-2 cm) by the magnitude x than the liquid level 6 in order to ensure an initial contact of the fibers only with unconsumed; i.e., fresh treatment liquor. This part of the apparatus is associated, directly thereabove, over the operating width, on both sides of the introduced wool fiber web 3, with spray means consisting of pipes 13, 14 arranged in parallel to the length of material and above the squeeze roll pair 12, the spray ports of these pipes being oriented toward, respectively, one deflector plate 15, 16 located therebelow; these plates conduct the liquor that is uniformly distributed thereon into the roll nip 12'. The layer of liquor flowing off the deflector plates 15, 16 is thus oriented, rather than directly against the wool slivers 3, more toward the rolls 17, 18 of the pair of squeeze rolls 12 so that wetting of the wool slivers 3 takes place only immediately prior to reaching the roll nip 12'. Under practical conditions, a liquid accumulation will be formed above the narrowest point of the nip 12' of the squeeze roll pair 12, but this should not lead to overflowing above the rolls 17, 18 of the squeeze roll pair 12.

Figure 2:
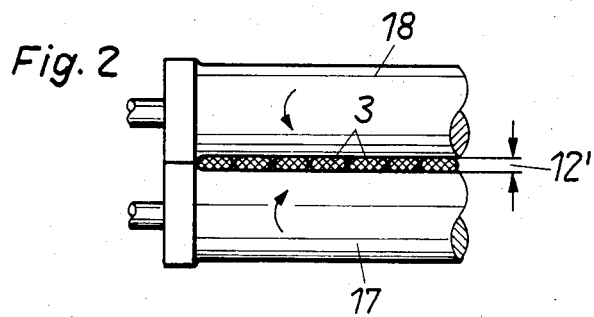
FIG. 2 shows a top view of the pair of squeeze rolls arranged at the inlet to the treatment bath.

The squeeze roll pair 12 consists of two oppositely rotating rolls or cylinders 17, 18 shown in a top view in FIG. 2. They exhibit an annular groove over their operating width in such a way that a roll nip 12' of 3-7 mm can be set. In this roll nip 12', the wool slivers 3, seen from above in FIG. 2, are arranged in close juxtaposition. If there should be any air bubbles still adhering to the fibers between the fibers of the wool slivers 3, then the bubbles will be urged out at the latest in this narrowing gap 12' and will be replaced by the liquor. This kind of wetting must not be confused with a nip padder. In the padder, the liquid absorbed by the material is squeezed out to an optimum extent; whereas in the present case, squeezing takes place only with respect to the air to be removed. The liquor is to accompany the slivers 3 in its entirety.

The wool slivers 3 will then travel, accompanied by the liquor offered in excess, through the guide channel 19. The liquor, depleted in hypochlorous acid already at this point, will accompany the wool slivers 3 in synchronism therewith, perhaps even faster than the slivers, around the underside of the first guide roll 9 and then flow in a meander-like fashion around the remainder of the guide rolls 9. The thus-formed guide channel 19 can also be entirely omitted, or it can be replaced only by a guide roll 9. Since chlorination takes place essentially in the zone of the pair of squeeze rolls 12, the guide channel 19 and the concomitant rinsing of the wool fibers with the liquid are essentially of advantage primarily for a cleaning operation. A washing step takes place herein, preventing the setting of inorganic salts, or oils, and of grease.

In order to make the guide channel 19 only of such a size as to be adequate for removing the amount of liquid applied by the spray means 13, 14, displacement members 5, 20 are associated with the guide rolls 9 on the top sides as well as bottom sides thereof and are secured to the housing by appropriate support means (not shown). These displacement members 5, 20 leave only the material guide channel 19 vacant, for which purpose the displacement members 5, 20 are provided with the troughs 7 on the underside and with the annular recess 21 on the topside. Otherwise the displacement members terminate in rather close proximity to the guide rolls 9. It may be expedient to fashion the guide channel 19 around the respective guide roll 9 to be conical; i.e., to be wider at the respective inlet than at the outlet, in order to avoid a possible damming up of wool fibers in the zone of changeover from one guide roll 9 to the other.

Figure 3:
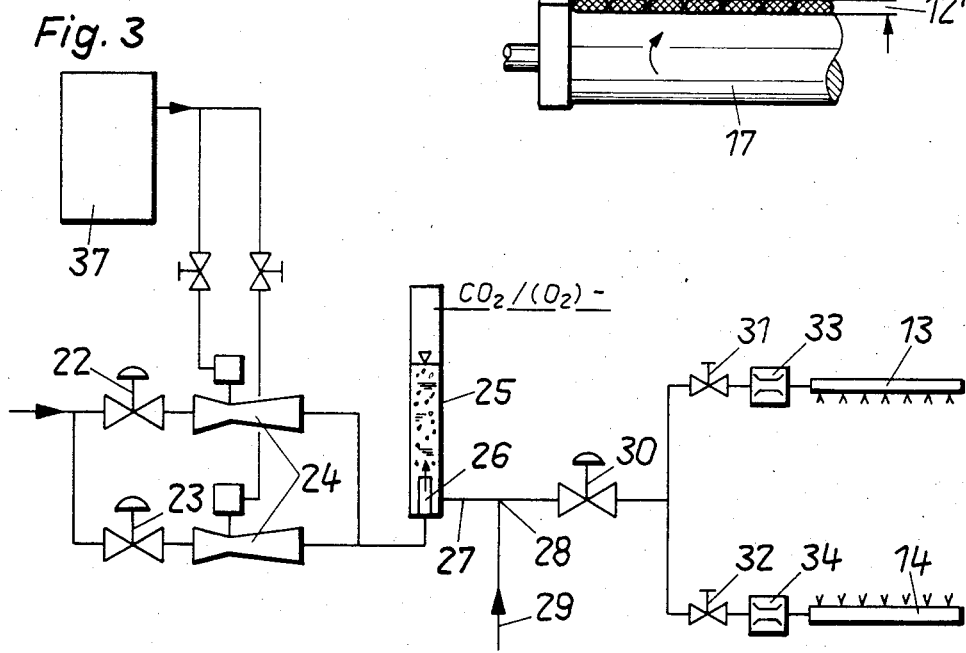
FIG. 3 is a schematic view of the chlorinating and degasifying installation arranged upstream of the spraying means.

The liquor introduced into the spray pipes 13, 14 is prepared in a mixing station shown partially in FIG. 3. For this purpose, water is fed under high pressure via the closable valves 22, 23 to two Venturi nozzles 24, the chlorine gas fed from tank 37 being introduced at the narrowest point thereof. Two such injectors 24 are advantageous to adapt the quantity of liquid to the respective consumption. An injector is calibrated to a specific quantity of water. Therefore, by means of two injectors 24, several efficiency stages can be set during chlorination in housing 1. On account of the high speed of the water, a vacuum is produced in the respective nozzle, taking in the gas and blending same with the water. In this very simple and permanently safe way of performing the mixing step, however, gas bubbles are formed in the liquor which must be removed before a wetting agent is added. For this reason, a standpipe 25 is interposed in the feed conduit downstream of the injectors 24, this standpipe being open toward the top and provided with an inlet and outlet. The outlet 27 is provided at a spacing below the inlet 26 so that the liquid supplied through the inlet must first be degasified before it flows to the point 28 where the surfactant 29 is being added. The gas collecting at the top in the stand pipe 25 can be conducted, for safety reasons, through a hose, not shown, into the housing 1 where an exhaust means is already in operation on account of the chlorine gas rising therein.

The thus well-prepared liquor then flows to the spray pipes 13, 14 through additional valves 30–32 and mixing devices (rotameters) 33, 34.

An essential feature of the process of this invention and of the apparatus provided for conducting the process resides in that water in the treatment liquor is applied to the slivers with an excess amount; namely, up to sevenfold as compared with the weight of the slivers. While mixing the chlorine gas with the excess amount of water supplied, the latter is, however, not as yet exhausted; rather, it can be conducted via the drain 36 to a filter after completion of the treatment, purified in this filter, and then recycled to the treatment operation. The quantity of reusable water is suitably introduced upstream of the closable valves 22, 23.

It will be appreciated that one advantage of the chlorination process according to the invention consists in the spontaneous reaction of hypochlorous acid with the wool, chiefly because of the higher temperature of the solution (up to 25° C.). The reaction between the hypochlorous acid and the wool which immediately occurs has the consequence that the percent concentration of the hypochlorous acid in the water-chlorine solution immediately drops considerably. Thus, the concentration of the hprochlorous acid for example is still only 45 downstream of feed roller pair 18 when the solution added via nozzles 13, 14 is 100%. Beyond the first roller 9 in bath 5, the concentration of the hypochlorous acid is still only 25% and beyond the second roller, 6%. It is thus evident that the reaction between the wool and the hyrpchlorous acid occurs very rapidly.

What is claimed is:

1. A process for rendering wool slivers shrinkproof in an aqueous solution of a hypochlorous acid and with subsequent squeezing out, washing, and drying, wherein an aqueous solution of hypochlorous acid having a pH of 2.0–3.0 is initially applied to the wool slivers on both sides and the initially treated slivers are introduced into a bath made up of a solution of said hypochlorous acid having a reduced acid concentration, said process being characterized in that a fresh aqueous solution of hypochlorous acid is obtained from reaction of gaseous chlorine and water; the fresh aqueous solution of hypochlorous acid is continuously applied and is brought into all-around contact with the slivers at a temperature of about 10°–25° C. with a multi-fold excess, based on the weight of the dry slivers; the slivers are passed immediately thereafter through a guide slot, together with the applied excess quantity of the solution to remove any occluded gas bubbles from the slivers and the slivers are thus completely wetted; the wetted slivers are then transported continuously to a squeezing-out zone through the bath made up of an aqueous solution of hypochlorous acid wherein the concentration of acid is reduced via a small-volume guide channel together with a portion of the applied solution; and the slivers are passed to a squeezing-out zone wherein the aqueous solution is squeezed from the slivers.

2. A process according to claim 1, characterized in that the wool slivers are brought into all-around, unimpeded contact with the solution prior to being passed through a pair of squeezed rollers defining the guide slot therebetween.

3. A process according to claim 2, characterized in that the wool slivers are actively transported through the guide slot.

4. A process according to claim 1, characterized in that the slivers, downstream of the guide slot, are transported essentially along a horizontal path and side guide channel.

5. A process according to claim 1, characterized in that the introduced aqueous solution is mixed, prior to being applied, with a wetting agent.

6. A process according to claim 5, characterized in that the aqueous solution is separated from any gas bubbles present prior to being mixed with the wetting agent.

* * * * *